Sept. 24, 1957  J. J. E. DUVAL  2,807,520
METHOD OF SEPARATING WATER AND ANHYDROUS SODIUM SULFATE
FROM COAGULATING AND WASHING BATHS EMPLOYED IN
VISCOSE MANUFACTURING PROCESSES
Filed March 9, 1954
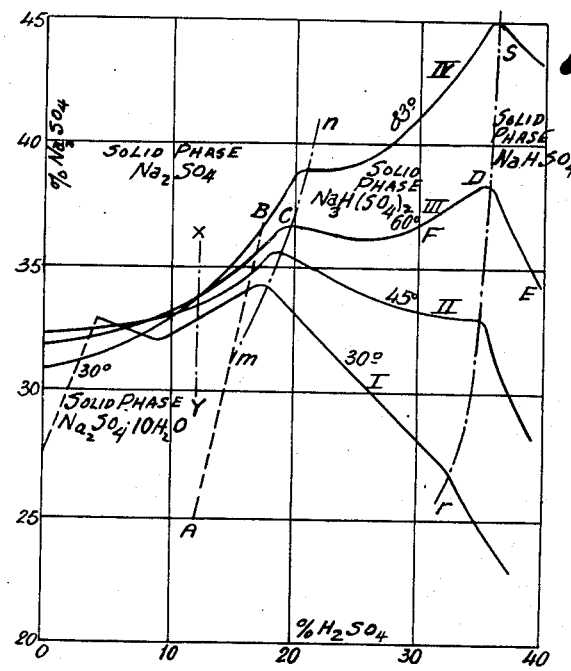
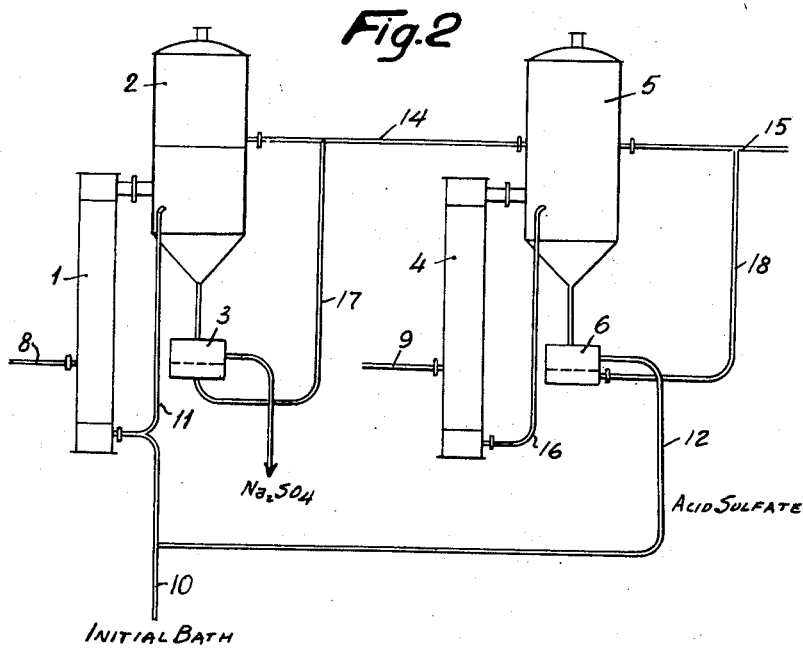

United States Patent Office 2,807,520
Patented Sept. 24, 1957

2,807,520

METHOD OF SEPARATING WATER AND ANHYDROUS SODIUM SULFATE FROM COAGULATING AND WASHING BATHS EMPLOYED IN VISCOSE MANUFACTURING PROCESSES

Jean Joseph Edouard Duval, Paris, France, assignor to Société dite: Appareils & Évaporateurs Kestner, Lille, France, a corporation of France Application March 9, 1954, Serial No. 415,112

Claims priority, application France November 20, 1953

6 Claims. (Cl. 23—121)

In installations where viscose is treated for manufacturing yarns, films and other articles, the viscose is coagulated by means for a so-called coagulating or spinning bath containing sulfuric acid.

As viscose is an aqueous solution of sodium xanthogenate, it follows that the acid bath is diluted by the water supplied by the viscose solution and also by the water employed for washing the final product (yarn, film, etc.), and becomes loaded with sodium sulfate corresponding to the sodium content of the viscose.

If the bath is to maintain its proportion of water and sodium sulfate in view of the coagulating action required therefrom, it will be necessary:

(1) To evaporate any excess water;
(2) To separate the formed sodium sulfate;
(3) To add sulfuric acid to compensate for that neutralized by the viscose and lost during the treatment.

In hitherto known methods steps (1) and (2) were carried out separately.

The excess water was evaporated in an evaporator of a type known per se, heated by means of a suitable heating medium such as steam, hot gases, etc.

The crystallization of sodium sulfate was effected by cooling either the coagulating bath as it circulates in the coagulating installation; or one portion, or all, of the concentrated bath issuing from the evaporator.

This crystallizing step is carried out at a sufficiently low temperature, as a rule at about 0° to 10° C., and, in this case, the sodium sulfate is precipitated in the form of decahydrated sodium sulfate $Na_2SO_4 \cdot 10H_2O$.

This crystallization is effected in crystallizers of a type known per se, which are cooled by using brine and cool water, or by expanding the bath under high vacuum conditions.

The drawback of this method is the production of the salt $Na_2SO_4 \cdot 10H_2O$, which is a difficultly marketable product, whereas if this salt was obtainable in the form of anhydrous sulfate, that is to say $Na_2SO_4$, it would not be difficult to find important markets for the large amounts recoverable in viscose plants.

Consequently, it has been attempted to transform the decahydrated sulfate into anhydrous sulfate either by drying, or by melting the decahydrated sulfate in its water of crystallization and evaporating the solution. In this last instance, a difficulty arises due to the quick furring of the heating surface of the evaporator by precipitated anhydrous sulfate. This quick furring is caused by a specific feature of the anhydrous sodium sulfate wherein this substance has a solubility curve decreasing with increasing temperatures. This solubility is approximately as follows:

48.8 gr. of $Na_2SO_4$ for 100 gr. of water at 40° C.
46.7 gr. of $Na_2SO_4$ for 100 gr. of water at 50° C.
45.3 gr. of $Na_2SO_4$ for 100 gr. of water at 60° C.
43.7 gr. of $Na_2SO_4$ for 100 gr. of water at 80° C.
42.5 gr. of $Na_2SO_4$ for 100 gr. of water at 100° C.

Since any transfer of heat across the wall of the heat exchanger of the evaporator is necessarily attended by an increase in temperature of the layer of solution contacting the heater wall, the anhydrous sodium sulfate, of which the solubility decreases as this temperature increases, as indicated hereinabove, will precipitate on the heat exchange wall surface, thereby inducing a quick furring thereof which is detrimental to the transmission of heat and makes it necessary to wash the apparatus very frequently.

On the other hand, this mode of operation requires an additional evaporator and thus the complete installation would consists of an evaporator for evaporating the excess water from the bath, a crystallizer, and an evaporator for converting the decahydrated sulfate into anhydrous sulfate.

It is the object of this invention to provide a novel method whereby the steps of evaporating the excess water from the bath and forming the anhydrous sulfate can be carried out in a single installation, without passing through the intermediate step of crystallizing the substance to $Na_2SO_4 \cdot 10H_2O$, with the additional advantage of avoiding the inconvenience of furred heat surfaces.

This method is based on the following facts:

It has been found that, as a rule, coagulation baths employed in viscose treating plants have the following composition:

$H_2SO_4$ ------------------------- from 10 to 13%
$Na_2SO_4$ ------------------------ from 18 to 30% and other salts such as zinc sulfate may also be present but in lower quantities.

In the recovery contemplated, the amount of water to be evaporated and the amount of sulfate to be separated from the bath are in a substantially constant ratio to each other, in the case of each specific plant, as this ratio depending on the water and sodium content of the viscose used. As a rule, the ratio:

$$\frac{\text{weight of water to be evaporated}}{\text{weight of anhydrous sulfate to be separated}} \text{ lies between 5 and 7}$$

Therefore, the operation contemplated, which is a combination of the evaporating and crystallizing steps, should produce this ratio. The solubility graph of Fig. 1 of the accompanying drawing shows clearly how the method works.

In this graph curves, I, II, III and IV represent the solubility at increasing temperatures (30°, 45°, 60° and 83°) of sodium sulfate in sulfuric acid solutions, the acid percentage being plotted as the abscissa and the sulfate percentage as the ordinate. Curves $m$—$n$ and $r$—$s$ are also drawn to limit the zones in which the various solid phases exist, that is to say the zones wherein anhydrous $Na_2SO_4$—$Na_3H(SO_4)_2$—$NaHSO_4$ exist.

Assuming now that the coagulating bath to be recovered contains 12% of $H_2SO_4$ and 25% of $Na_2SO_4$, these percentages corresponding to point A of the graph. It will also be assumed on the other hand that the evaporation took place at a temperature of 60° C., as would be the case in an evaporator operating in vacuo. The solution-designating point would first move along the straight line A—B to point B where saturation into anhydrous sulfate is reached; in this zone, the precipitate actually is anhydrous sulfate $Na_2SO_4$ and $Na_2SO_4$ will continue to be precipitated until the point designating the solution reaches C., where the content of mother-liquor is about 20% of $H_2SO_4$ and 37% of $Na_2SO_4$.

Consequently, if the aforesaid separation is to take place in a single apparatus, the evaporation produced should be limited to this point, so that only anhydrous sulfate will be separated.

As a result, at this point for every 1,000 kilograms of initial bath containing, according to the above-disclosed hypothesis, 120 kg. of H₂SO₄, 250 kg. of Na₂SO₄ and 630 kg. of water, the resulting mother-liquor would contain at point C 120 kg. of H₂SO₄, 220 kg. of Na₂SO₄ and 260 kg. of water. In other words, this operation would lead to evaporating 630–260=370 kg. of water and separating 250–220=30 kg. of anhydrous sulfate, thus providing a ratio of evaporation to crystallization $$\frac{370}{30}=12.5$$

This demonstrates clearly that to separate the sulfate to be eliminated from the bath it would be necessary to evaporate an amount of water considerably greater than that normally evaporated during manufacture since this ratio, as already set forth hereinabove, should lie only between 5 and 7.

Now, the method according to the present invention makes it possible to avoid this drawback.

According to this method, evaporation is carried out until the acid salt Na₃H(SO₄)₂ and even sodium bisulfate NaHSO₄ separate from each other, and it takes place in two or more stages so that the acid salt separated from the second and subsequent stages is returned to the first stage supplied with initial liquor. Assuming as hereinabove that the operation is carried out at a temperature of 60° C., this will mean that the point designating the mother-liquor will be displaced along the curve C—D—E.

The evaporation carried out in the first stage is limited to such a value that the mother-liquor designating point will remain on the left of curve m—n, that is to say in the zone wherein the solid phase is anhydrous Na₂SO₄.

Thus, assuming that the plant be divided into two separate bodies through which the bath to be treated circulates in series, and that the mother-liquor extracted from the second body have a H₂SO₄ content of 30%, that is, containing at 60° C. 37% of Na₂SO₄ (point F), for every 1,000 kg. of bath introduced, having a content corresponding to point A, i. e. containing 120 kg. of H₂SO₄, 250 kg. of Na₂SO₄ and 630 kg. of H₂O, the composition of the mother-liquor at point F will be as follows, the amount of sulfuric acid remaining unchanged: 120 kg. of H₂SO₄, 148 kg. of Na₂SO₄ and 132 kg. of H₂O.

Thus, a total amount of 630–132=498 kg. of water will be evaporated, while 250–148=102 kg. of anhydrous sodium sulfate will be separated, thus yielding a ratio of evaporation to crystallization of 4.95, that is, commensurate with the aforesaid essential requirement.

According to the ratio measured in each plant, the point F may be fixed at any convenient value on curve C—D—E for fulfilling this requirement.

The preceding example, wherein the composition of the first body is limited to that of point C so as to separate the sulfate from the first body in the form of anhydrous Na₂SO₄, will cause the evaporation of 306 kg. of water in the first body and 192 kg. in the second body, and return from the second to the first body 175 kg. of acid salt Na₃H(SO₄)₂.

The diagram shown in Fig. 2 shows diagrammatically a practical embodiment of an installation for carrying out this method.

The first body consists of an evaporator comprising a steam-heated evaporator 1, a separator 2 in which the steam is separated from the liquid, and a drier or filter 3 for the sulfate.

The second body consists of the same apparatus, viz., an evaporator 4, a separator 5 and a drier or filter 6 for separating the acid sulfate.

The necessary piping for conducting materials to and from the apparatus units has also been shown in the drawing. Thus, evaporators 1 and 4 have inlets 8 and 9 for the steam by means of which they are heated. The charge to the evaporator which enters through line 10 and the charge is supplemented by material flowing from separators 2 and 5 through lines 11 and 12, respectively. Transfer between separators 2 and 5 is effected through a line 14 and from separator 5 to a further processing unit (not shown) through a line 15. Return of material for further evaporation from separator 5 is effected through a line 16. Filters 3 and 6 are connected to lines 14 and 15, respectively by lines 17 and 18, respectively.

The initial bath is introduced into the first body and so evaporated therein that the point indicating the liquid contained in this apparatus will remain on the left of curve m—n, i. e. in the zone of existence of the anhydrous sodium sulfate.

The mother-liquors are fed to the second body where evaporation is carried out until a certain degree of precipitation of acid sulfate Na₃H(SO₄)₂ (or sodium bisulfate, NaHSO₄) is obtained. The salt precipitated in the second body is separated through a filter or drier 6. The acid salt is returned to the first body together with the initial liquid.

In this first body, the acid sulfate is converted into anhydrous sulfate since no other substance can stand the conditions of operation of the first body. This anhydrous sodium sulfate is separated in the filter or drier 3.

It will be noted that the inconvenience indicated hereinabove regarding the evaporation of sodium sulfate solutions due to furring is avoided completely in the method claimed. As a matter of fact, as long as evaporation is effected on mother-liquors, having a designated point positioned on the right-hand side of the straight line x—y, i. e. when the sulfuric acid content is higher than 12% H₂SO₄, this point will lie in a zone wherein the solubility increases with temperature (see Fig. 1).

On the left-hand side of this straight line x—y, it is apparent that solubilities decrease with increasing temperatures, as generally observed when the sodium sulfate solutions are neutral.

The evaporating bodies constituting the installation when arranged in multiples may obviously operate at different temperatures so that each body may constitute the various "actions" of a multiple-action unit; thus, if two bodies are provided, the unit will be double-acting, if three bodies are provided, the unit will be triple-acting, and so forth.

I claim:

1. A process for treating the aqueous coagulating bath liquor from a viscose rayon operation containing at least 10% H₂SO₄ and sodium sulfate to separate water and anhydrous sodium sulfate therefrom which comprises, heating said liquor in a first evaporation zone at a temperature above about 30° C. to effect the precipitation of anhydrous sodium sulfate as the sole solid phase and discontinuing said evaporation in said first zone before the appearance of a solid phase of an acid salt, separating said precipitated anhydrous sodium sulfate from said liquor, introducing said liquor into a second evaporation zone and heating said liquor in said second zone to effect precipitation of an acid salt of the group consisting of Na₃H(SO₄)₂, NaHSO₄ and mixtures thereof, separating said acid salt from the liquor in said second zone, returning said liquor to the viscose rayon bath, and adding said acid salt to the liquor being fed to said first evaporation zone.

2. A process for treating the aqueous coagulating bath liquor from a viscose rayon operation containing at least 10% H₂SO₄ and sodium sulfate to separate water and anhydrous sodium sulfate therefrom which comprises, heating said liquor in a first evaporation zone at a temperature of aboue 60° C. to effect the precipitation of anhydrous sodium sulfate as the sole solid phase and discontinuing said evaporation in said first zone before the appearance of a solid phase of an acid salt, separating said precipitated anhydrous sodium sulfate from said liquor, introducing said liquor into a second evaporation zone and heating said liquor in said second zone at a temperature of about 60° C. to effect precipitation of an acid salt of the group consisting of $Na_3H(SO_4)_2$, $NaHSO_4$ and mixtures thereof, separating said acid salt from the liquor in said second zone, returning said liquor to the viscose rayon bath, and adding said acid salt to the liquor being fed to said first evaporation zone.

3. A process for treating the aqueous coagulating bath liquor from a viscose rayon operation containing at least 10% $H_2SO_4$ and sodium sulfate to separate water and anhydrous sodium sulfate therefrom which comprises, heating said liquor in a first evaporation zone at a temperature above about 30° C. to effect the precipitation of anhydrous sodium sulfate as the sole solid phase and discontinuing said evaporation in said first zone before the appearance of a solid phase of an acid salt, separating said precipitated anhydrous sodium sulfate from said liquor, introducing said liquor into a second evaporation zone and heating said liquor in said second zone at said predetermined temperature to effect precipitation of an acid salt of the group consisting of $Na_3H(SO_4)_2$, $NaHSO_4$ and mixtures thereof, said first evaporation zone and said second evaporation zone being at the same pressure, separating said acid salt from the liquor in said second zone, returning said liquor to the viscose rayon bath, and adding said acid salt to the liquor being fed to said first evaporation zone.

4. A process for treating the aqueous coagulating bath liquor from a viscose rayon operation containing at least 10% $H_2SO_4$ and sodium sulfate to separate water and anhydrous sodium sulfate therefrom which comprises, heating said liquor in a first evaporation zone at a temperature above about 30° C to effect the precipitation of anhydrous sodium sulfate as the sole solid phase and discontinuing said evaporation in said first zone before the appearance of a solid phase of an acid salt, separating said precipitated anhydrous sodium sulfate from said liquor, introducing said liquor into a second evaporation zone and heating said liquor in said second zone at said predetermined temperature to effect precipitation of an acid salt of the group consisting of $Na_3H(SO_4)_2$, $NaHSO_4$ and mixtures thereof, said first evaporation zone and said second evaporation zone being at different pressures, separating said acid salt from the liquor in said second zone, returning said liquor to the viscose rayon bath, and adding said acid salt to the liquor being fed to said first evaporation zone.

5. A process for treating the aqueous coagulating bath liquor from a viscose rayon operation containing at least 10 to 13% $H_2SO_4$ and 18 to 30% sodium sulfate to separate water and anhydrous sodium sulfate therefrom which comprises, heating said liquor in a first evaporation zone at a temperature of 30 to 83° C. to effect the precipitation of anhydrous sodium sulfate as the sole solid phase and discontinuing said evaporation in said first zone before the appearance of a solid phase of an acid salt, separating said precipitated anhydrous sodium sulfate from said liquor, introducing said liquor into a second evaporation zone and heating said liquor in said second zone at said temperature to effect precipitation of an acid salt of the group consisting of $Na_3H(SO_4)_2$, $NaHSO_4$ and mixtures thereof, separating said acid salt from the liquor in said second zone, returning said liquor to the viscose rayon bath, and adding said acid salt to the liquor being fed to said first evaporation zone.

6. A process for treating the aqueous coagulating bath liquor from a viscose rayon operation containing at least 10% $H_2SO_4$ and sodium sulfate to separate water and anhydrous sodium sulfate therefrom which comprises, heating said liquor in a first evaporation zone at a temperature above about 30° C to effect the precipitation of anhydrous sodium sulfate as the sole solid phase and discontinuing said evaporation in said first zone before the appearance of a solid phase of an acid salt, separating said precipitated anhydrous sodium sulfate from said liquor, introducing said liquor into a second evaporation zone and heating said liquor in said second zone to effect precipitation of an acid salt of the group consisting of $Na_3H(SO_4)_2$, $NaHSO_4$ and mixtures thereof, separating said acid salt from the liquor in said second zone, returning said liquor to the viscose rayon bath, and adding acid salt to the liquor being fed to said first evaporation zone, the total amount of water evaporated being related to the total amount of anhydrous sodium sulfate recovered in the ratio of 5–7 to 1.

References Cited in the file of this patent

UNITED STATES PATENTS

| | | |
|---|---|---|
| 2,482,830 | Allen | Sept. 27, 1940 |
| 2,645,561 | Malon | July 14, 1953 |